US012428704B2

(12) United States Patent
Sah et al.

(10) Patent No.: US 12,428,704 B2
(45) Date of Patent: Sep. 30, 2025

(54) NICKEL-BASED SUPERALLOY FOR DIFFUSION BONDING AND METHOD FOR DIFFUSION BONDING USING THE SAME

(71) Applicant: KOREA ATOMIC ENERGY RESEARCH INSTITUTE, Daejeon (KR)

(72) Inventors: In Jin Sah, Sejong-si (KR); Jong Bae Hwang, Sejong-si (KR); Eung Seon Kim, Sejong-si (KR); Min Hwan Kim, Sejong-si (KR)

(73) Assignee: KOREA ATOMIC ENERGY RESEARCH INSTITUTE, Daejeon (KR)

(*) Notice: Subject to any disclaimer, the term of this patent is extended or adjusted under 35 U.S.C. 154(b) by 200 days.

(21) Appl. No.: 17/903,027

(22) Filed: Sep. 5, 2022

(65) Prior Publication Data

US 2023/0002862 A1 Jan. 5, 2023

Related U.S. Application Data

(62) Division of application No. 16/952,178, filed on Nov. 19, 2020, now abandoned.

(30) Foreign Application Priority Data

Nov. 27, 2019 (KR) ........................ 10-2019-0154595

(51) Int. Cl.

*C22C 19/05* (2006.01)
*B23K 1/20* (2006.01)
*B23K 20/02* (2006.01)

(52) U.S. Cl.

CPC .............. *C22C 19/055* (2013.01); *B23K 1/20* (2013.01); *B23K 20/02* (2013.01)

(58) Field of Classification Search

None

See application file for complete search history.

(56) References Cited

U.S. PATENT DOCUMENTS 4,405,379 A * 9/1983 Chasteen ................. C23G 5/00 228/206
4,566,939 A * 1/1986 Miller ....................... C25F 1/12 216/101
4,689,104 A * 8/1987 Lavendel ............. B23K 35/004 156/150

FOREIGN PATENT DOCUMENTS

EP 0201202 A1 * 12/1986 ............. B23K 20/04
WO WO-9962667 A1 * 12/1999 ............. B23K 20/16

OTHER PUBLICATIONS

Song et al., "A Study of Diffusion Bonding Performance of Inconel 617 Heat Exchanger", International Journal of Precision Eng. and Manufac., vol. 16, No. 5, p. 957-963, 2015 (Year: 2015).*
Walker, Megan. Effect of Pre-oxidation and Thermal exposure on Superalloys and Thermal Barrier Coating Systems, Masters Thesis, Carleton University, 2016 (Year: 2016).*

* cited by examiner

*Primary Examiner* — Devang R Patel
(74) *Attorney, Agent, or Firm* — LEX IP MEISTER, PLLC

(57) ABSTRACT

The present invention relates to a nickel-based superalloy for diffusion bonding, which includes a surface depletion layer in a state in which an aluminum (Al) or titanium (Ti) content is depleted, the surface depletion layer being formed to a depth of 50 μm or less from a surface for diffusion bonding, and a method for diffusion bonding using the same.

7 Claims, 10 Drawing Sheets

NICKEL-BASED SUPERALLOY FOR DIFFUSION BONDING AND METHOD FOR DIFFUSION BONDING USING THE SAME

CROSS-REFERENCE TO RELATED APPLICATION

This application is a Divisional Applications of U.S. patent application Ser. No. 16/952,178, which was filed on Nov. 19, 2020, which claims priority to and the benefit of Korean Patent Application No. 10-2019-0154595, filed on Nov. 27, 2019, the disclosure of which is incorporated herein by reference in its entirety.

BACKGROUND

1. Field of the Invention

The present invention relates to a nickel-based superalloy for diffusion bonding (particularly, an alloy derived from a parent material of a solid solution strengthened nickel-based superalloy) and a method for diffusion bonding using the same.

2. Discussion of Related Art

Bonding is classified into liquid-phase bonding and solid-phase bonding according to whether two materials to be bonded (a metal, a ceramic, a polymer, etc.) are phase-transformed from a solid phase to a liquid phase during bonding. As one method of solid-phase diffusion, diffusion bonding is a technique for bonding materials using a diffusion phenomenon of atoms. Accordingly, it is known that a diffusion-bonded material has mechanical performance and microstructures at an interface and near the interface at the same levels as those of a parent material.

The prior art focuses on presenting optimal conditions by regulating variables (temperature, compressive load, environment, surface condition, post heat treatment) used for diffusion bonding. The diffusion bonding method according to the prior art is extremely limited in grain boundary movement due to secondary phase formation at an interface. This is a phenomenon in which an oxide is formed at an interface due to aluminum (Al) and titanium (Ti) intentionally included in a solid solution strengthened nickel-based superalloy to improve oxidation/corrosion resistance and ensure excellent high temperature strength, and has a problem of weak integrity of the interface under a high temperature operating condition.

In addition, to address the formation of planar grains at an interface, the prior art showed that it is possible to form spherical grains similar to a parent material at the interface by promoting interdiffusion due to composition differences of elements by inserting an intermediate insert (Ni, Ni—Cr foil, etc.) before diffusion bonding or applying the main component (Ni, etc.) of a parent material to a surface using various deposition methods. However, this may increase costs due to an additional process, and it is still difficult to apply it to a high temperature apparatus with a complicated shape. In addition, the prior art may be a method of addressing the formation of planar grains at the interface, but basically, there is a problem of secondary phases remaining at the interface.

PRIOR ART

Patent Document

Korean Patent Publication No. 10-1527112 (Jun. 2, 2015).

SUMMARY OF THE INVENTION

The present invention is directed to providing a nickel-based superalloy for diffusion bonding of a nickel-based superalloy, which includes a surface depletion layer in a state in which an aluminum (Al) or titanium (Ti) content is depleted to inhibit or reduce the secondary phase formation by Al or Ti at the interface between the nickel-based superalloys, wherein the surface depletion layer is formed to a depth of 50 μm or less from a surface for diffusion bonding.

However, technical problems to be solved in the present invention are not limited to the above-described problems, and other problems which are not described herein will be fully understood by those of ordinary skill in the art from the following descriptions.

The present invention provides a nickel-based superalloy for diffusion bonding, which includes a surface depletion layer in a state in which an Al or Ti content is depleted, wherein the surface depletion layer is formed to a depth of 50 μm or less from a surface for diffusion bonding.

In addition, the present invention provides a method for diffusion bonding of a nickel-based superalloy, which includes: (a) pre-oxidizing a parent material of a nickel-based superalloy to form an outer oxide film and an inner oxide; (b) removing the formed outer oxide film and an inner oxide-containing layer; and (c) preparing a diffusion-bonded nickel-based superalloy material by performing diffusion bonding on the nickel-based superalloy from which the formed outer oxide film and inner oxide-containing layer are removed. In Step (c), the nickel-based superalloy includes a surface depletion layer in a state in which an Al or Ti content is depleted, and the surface depletion layer is formed to a depth of 50 μm or less from a surface for diffusion bonding.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1A:
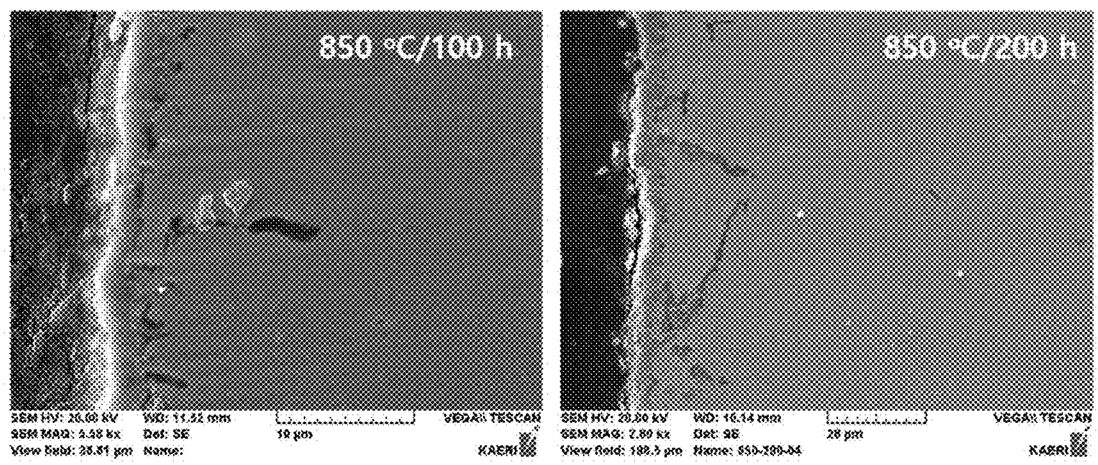
FIGS. 1A to 1C are a scanning electron microscope (SEM) image of a nickel-based superalloy in which an outer oxide film, an inner oxide and a depletion layer are formed after pre-oxidation at 850° C. according to Example 1 and electronic probe microanalyzer (EPMA) graphs thereof.

While researching the inhibition or reduction of the secondary phase formation by Al or Ti at the interface between nickel-based superalloys during diffusion bonding of the nickel-based superalloy, the inventors prepared a nickel-based superalloy including a surface depletion layer in a state in which an Al or Ti content is depleted through pre-oxidation and removal and then performed diffusion bonding thereon, thereby confirming excellent mechanical characteristics (stress and strain), and thus the present invention was completed.

Hereinafter, the present invention will be described in detail.

Nickel-Based Superalloy for Diffusion Bonding

The present invention provides a nickel-based superalloy for diffusion bonding, which includes a surface depletion layer in a state in which an aluminum (Al) or titanium (Ti) content is depleted, and is formed to a depth of 50 μm or less from a surface for diffusion bonding.

The "nickel-based superalloy for diffusion bonding" refers to a matrix in a state in which at least a part or all of an inner oxide-containing layer is removed while an outer oxide film formed through pre-oxidation from a nickel-based superalloy parent material is completely removed, and is subjected to diffusion bonding. In this regard, the "pre-oxidation," "outer oxide film" and "inner oxide" will be described later The nickel-based superalloy parent material preferably uses a solid solution strengthened nickel-based superalloy parent material having a low Al or Ti content to effectively form a surface depletion layer in which an Al or Ti content is depleted in the nickel-based superalloy, but the present invention is not limited thereto. Meanwhile, the use of a precipitate-strengthened nickel-based superalloy parent material having a relatively high Al or Ti content has a limit in effectively forming a surface depletion layer only through pre-oxidation. In the present invention, as the nickel-based superalloy parent material, Alloy 617 was used.

Here, since Al or Ti is used to form an inner oxide in the nickel-based superalloy parent material, the nickel-based superalloy includes a surface depletion layer in which an Al or Ti content is depleted, compared to the nickel-based superalloy parent material. Meanwhile, since chromium (Cr) is used to form an outer oxide film in the nickel-based superalloy parent material, the nickel-based superalloy may include a surface depletion layer in which a chromium (Cr) content is also depleted compared to the nickel-based superalloy parent material.

Accordingly, although the entire composition of the nickel-based superalloy has a low Al or Ti content compared to the nickel-based superalloy parent material, and may also have a low Cr content, the entire composition of the nickel-based superalloy is as follows in detail.

Specifically, the nickel-based superalloy may include 20.0 to 24.0 wt % of Cr; 10.0 to 15.0 wt % of Co; 8.0 to 10.0 wt % of Mo; 0.8 to 1.5 wt % of aluminum (Al); 0.6 wt % or less of Ti; and the remainder of Ni.

Hereinafter, the role and effect of each element will be described:

(1) Chromium (Cr)

Cr is an element for increasing high temperature oxidation resistance, and a preferable Cr content is 20.0 to 24.0 wt %. Here, when the Cr content is less than 20.0 wt %, there is a problem in formation of a stable high temperature oxide film, and when the Cr content is more than 24.0 wt %, there is a problem caused by secondary phase formation according to high temperature aging.

(2) Cobalt (Co)

Co is an element for increasing high temperature strength due to a solid solution strengthening effect, and a preferable cobalt content is 10.0 to 15.0 wt %. Here, when the Co content is less than 10.0 wt %, there is a problem caused by a decrease in effective solid solution strengthening effect, and when the Co content is more than 15.0 wt %, there is a problem caused by secondary phase formation according to high temperature aging.

(3) Molybdenum (Mo)

Mo is an element for increasing high temperature strength according to a solid solution strengthening effect, and a preferable Mo content is 8.0 to 10.0 wt %. Here, when the Mo content is less than 8.0 wt %, there is a problem caused by a decrease in effective solid solution strengthening effect, and when the Mo content is more than 10.0 wt %, there is a problem caused by secondary phase formation according to high temperature aging.

(4) Aluminum (Al)

A is an element for increasing high temperature corrosion resistance and high temperature strength according to a precipitate strengthening effect, and a preferable Al content is 0.8 to 1.5 wt %. Here, when the Al content is less than 0.8 wt %, there is a problem caused by a decrease in high temperature corrosion resistance and a decrease in effective precipitate strengthening effect, and when the Al content is more than 1.5 wt %, there is a problem caused by secondary phase formation according to high temperature aging.

(5) Titanium (Ti)

Ti is an element for increasing high temperature strength according to a precipitate strengthening effect, and a preferable Ti content is 0.6 wt % or less, and preferably, more than 0 to 0.6 wt %. Here, when the Ti content is more than 0.6 wt %, there is a problem caused by secondary phase formation according to high temperature aging.

(6) Nickel (Ni)

Ni is an element serving as a base metal.

Other than these metals, the nickel-based superalloy may further include a maximum 3.0 wt % of iron (Fe), and a maximum 1.0 wt % of one or more selected from the group consisting of Mn, carbon (C), copper (Cu), silicon (Si), sulfur (S), boron (B) and phosphorus (P).

The surface depletion layer is in a state in which an Al or Ti content is depleted, compared to the nickel-based superalloy parent material, and the surface depletion layer is formed to a depth of 50 μm or less from a surface for diffusion bonding (that is, a surface directly subjected to diffusion bonding), and preferably a depth of 30 μm or less, but the present invention is not limited thereto.

Due to the surface depletion layer, it is possible to move a planar grain boundary formed at an interface through diffusion according to composition differences of elements during diffusion bonding, and the secondary phase formation by Al or Ti at an interface may be effectively inhibited or reduced, thereby forming intermetallic bonds.

As the surface depletion layer is closer to the surface of diffusion bonding, it may have a gradient in which the degree of depletion of an Al or Ti content increases. In other words, when the surface depletion layer is divided into an upper surface depletion layer and a lower surface depletion layer based on the halfway point of the depth of the surface depletion layer, the upper surface depletion layer has a higher degree of depletion of Al or Ti content compared to the lower surface depletion layer, but the present invention is not limited thereto. Therefore, as the diffusion bonding progresses on the surface of the surface depletion layer, planar grains formed at the interface may be formed into spherical grains through the diffusion according to composition differences of elements. Thus, the surface depletion layer may have the same levels of mechanical properties as those of a parent material at room temperature and high temperature.

Method for Diffusion Bonding of Nickel-Based Superalloy

The present invention provides a method for diffusion bonding of a nickel-based superalloy, which includes: (a) forming an outer oxide film and an inner oxide by pre-oxidizing a nickel-based superalloy parent material; (b) removing the formed outer oxide film and an inner oxide-containing layer; and (c) preparing a diffusion-bonded nickel-based superalloy material by performing diffusion bonding on the nickel-based superalloy from which the outer oxide film and inner oxide-containing layer are removed, and in Step (c), the nickel-based superalloy includes a surface depletion layer in a state in which an Al or Ti content is depleted, and the surface depletion layer is formed to a depth of 50 μm or less from a surface for diffusion bonding.

First, the method for diffusion bonding for a nickel-based superalloy according to the present invention includes forming an outer oxide film and an inner oxide by pre-oxidizing a nickel-based superalloy parent material (Step (a)) and removing the formed outer oxide film and inner oxide-containing layer (Step (b)).

The pre-oxidation refers to oxidation under a high temperature condition for forming an outer oxide film and an inner oxide in the nickel-based superalloy parent material, and may be performed under atmospheric conditions including oxygen at 600 to 1,200° C. for 0.1 to 500 hours, and preferably at 700 to 1,050° C. for 10 to 500 hours, but the present invention is not limited thereto.

The "outer oxide film" used herein refers to an oxide film formed by reaction with the external environment through pre-oxidation on the surface of the nickel-based superalloy parent material, may include chromium oxide, and specifically, a nickel oxide (NiO) layer, a nickel-chromium composite oxide (NiO—$Cr_2O_3$) layer and a chromium oxide ($Cr_2O_3$) layer may be sequentially formed based on the external environment through a reaction between oxygen provided from the external environment and nickel (Ni) and chromium (Cr). Here, the thickness of the outer oxide film may be 0.1 to 50 μm, and preferably 1 to 10 μm, but the present invention is not limited thereto.

Under the outer oxide film, a depletion layer in which a Cr content is depleted and a depletion layer in which an Al or Ti content is depleted may be formed.

The "inner oxide" used herein refers to an oxide formed in a matrix direction through pre-oxidation based on a surface of the nickel-based superalloy parent material, and may be formed by partial aggregation in the form of an icicle in the matrix. Through the reaction between oxygen provided from the external environment and aluminum (Al) or titanium (Ti), an aluminum oxide, a titanium oxide or a combination thereof may be formed. Here, the depth of the inner oxide may be 1 to 100 μm, and preferably, 5 to 30 μm, but the present invention is not limited thereto.

The outer oxide film may be completely removed, and the inner oxide-containing layer may be at least partially or completely removed. Here, the inner oxide-containing layer may only contain the inner oxide, but the inner oxide formed by partial aggregation in the form of an icicle may be formed in a matrix in a state in which an Al or Ti content is depleted. Here, the outer oxide film and the inner oxide may be removed through various known methods such as mechanical polishing.

The method for diffusion bonding of a nickel-based superalloy according to the present invention includes preparing a diffusion-bonded nickel-based superalloy material by performing diffusion bonding on the nickel-based superalloy from which the diffusion bonding on the outer oxide film and inner oxide-containing layer are removed (Step (c)).

The nickel-based superalloy from which the outer oxide film and inner oxide-containing layer are removed, which is subjected to the diffusion bonding, includes a surface depletion layer in a state in which an Al or Ti content is depleted, and the surface depletion layer may be formed to a depth of 50 μm or less from the surface for diffusion bonding, which has been described above, and thus duplicated descriptions will be omitted.

As the surface depletion layer is closer to the surface of diffusion bonding, it may have a gradient in which the degree of depletion of Al or Ti content increases, and as the diffusion bonding progresses on the surface of the surface depletion layer, planar grains formed at the interface may be effectively formed into spherical grains through diffusion according to composition differences of elements. In addition, during the diffusion bonding, the secondary phase formation by Al or Ti at the interface between the nickel-based superalloys is inhibited or reduced, and intermetallic bonds may also be formed. Therefore, the same levels of mechanical properties as those of the parent material may be maintained at room temperature and high temperature.

Specifically, the diffusion bonding may be performed under a vacuum condition at 1,000 to 1,200° C. under a compressive load of 10 to 20 MPa for 1 to 5 hours.

Selectively, the method for diffusion bonding of a nickel-based superalloy according to the present invention may further include thermally treating the formed diffusion-bonded nickel-based superalloy material at 1,000 to 1,200° C. for 1 to 100 hours (Step (d)).

Through the thermal treatment, planar grains remaining at the interface may be additionally formed into spherical grains by additional diffusion of atoms. In addition, after the thermal treatment, cooling to 10 to 30° C. may be performed through furnace cooling, air cooling or quenching.

In addition, the present invention may provide a plate heat exchanger manufactured using the method for diffusion bonding of a nickel-based superalloy.

As described above, the present invention relates to a nickel-based superalloy including a surface depletion layer in a state in which an Al or Ti content is depleted (particularly, an alloy derived from a solid solution strengthened nickel-based superalloy parent material) and a method for diffusion bonding using the same. Because of the surface depletion layer, it is possible to move a planar grain boundary formed at the interface through diffusion according to composition differences of elements during diffusion bonding, and the secondary phase formation by Al or Ti at the interface may be effectively inhibited or reduced, thereby forming intermetallic bonds. Thus, since the diffusion-bonded nickel-based superalloy material prepared according to the present invention maintains the same level of stress as that of the parent material at room temperature and high temperature, and particularly, has excellent strain at the parent material level at a high temperature of approximately 700° C. or more, it can be applied to the plate heat exchanger industry.

To increase the efficiency of a high temperature apparatus used in various industries (chemical, petrochemical, nuclear power and power generation fields), higher temperature and pressure conditions are required, and thus stainless steel currently used in the plate heat exchanger industry is expected to be replaced with a solid solution strengthened nickel-based superalloy in the near future. In addition, in the global heat exchanger market in 2016, the traditional shell & tube heat exchanger still accounted for the largest share, that is, 3.35 billion dollars, but in the trend of downsizing, lightening and modularization of a high temperature apparatus, plate-frame heat exchangers (3 billion dollars in 2016) are pursuing at a high annual growth rate of 7.11% on average. Comprehensively considering these points, the present invention is expected to activate the stagnant domestic manufacturing field according to this trend of the times and contribute to the export of products and technology through innovation.

Hereinafter, to help in understanding the present invention, exemplary examples will be suggested. However, the following examples are merely provided to more easily understand the present invention, and not to limit the present invention.

EXAMPLES

Example 1

As nickel-based superalloy parent materials, two plates of the same type of material such as Alloy 617 and UNS N06617 were prepared, and the composition thereof is shown in Table 1 below.

TABLE 1

| | Ni | Cr | Co | Mo | Fe | Mn | Al | Ti | C | Cu | Si | S | B | P |
|---|---|---|---|---|---|---|---|---|---|---|---|---|---|---|
| Composition (wt %) | 52.61 | 22.20 | 12.30 | 9.52 | 1.26 | 0.08 | 1.09 | 0.37 | 0.090 | 0.01 | 0.14 | <0.002 | 0.002 | <0.002 |

Figure 1B:
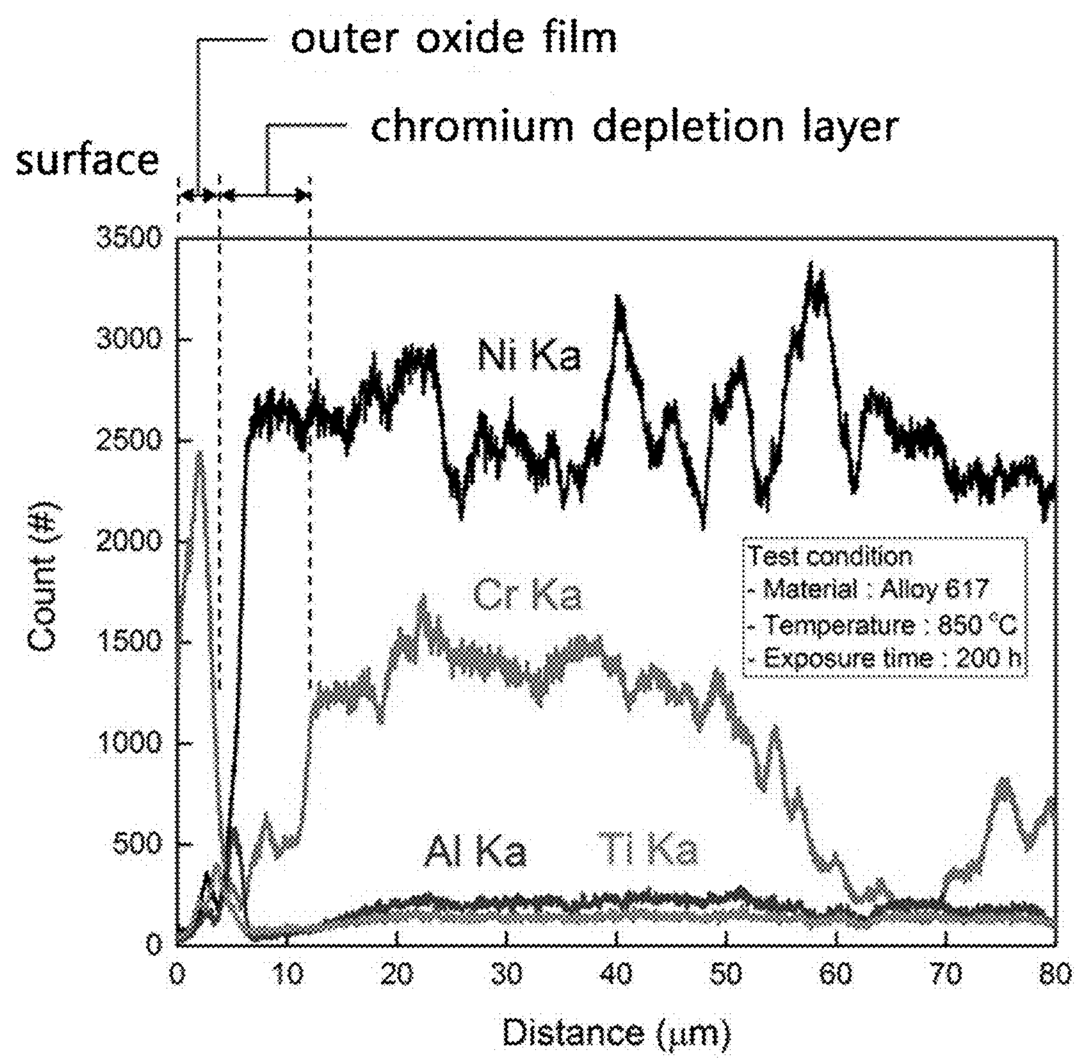
Figure 1C:
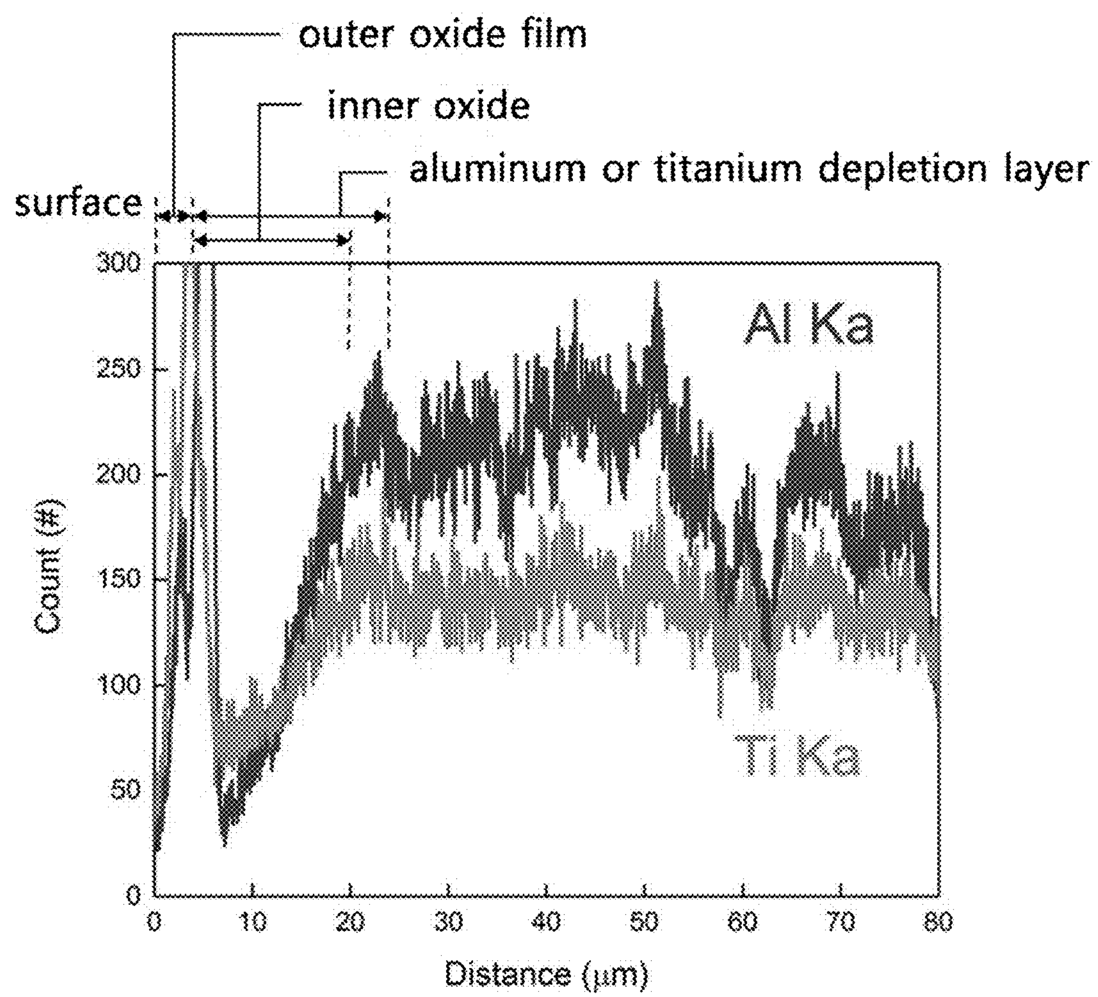

The plate-shaped Alloy 617 and UNS N06617 were pre-oxidized under atmospheric conditions at 850° C. for 100 to 200 hours to form an outer oxide film (containing chromium oxide) and an inner oxide (containing aluminum oxide and titanium oxide), respectively (see FIGS. 1A to 1C).

As confirmed from the SEM image of FIG. 1A, it is confirmed that both the thickness of the outer oxide film and the depth of the inner oxide increase as the pre-oxidation time elapses.

In addition, as confirmed from the EPMA graph of FIG. 1B, the thickness of the outer oxide film is determined by a point where the final peak of the Cr composition is greatly reduced, and it is confirmed that the point is spaced approximately 4 μm apart from a surface (the boundary between the environment and the outer oxide film after the outer oxide film is formed by pre-oxidation).

In addition, as confirmed from the EPMA graph of FIG. 1C, the depth of the inner oxide is determined by the maximum point where the Al- or Ti-based inner oxide is formed in the matrix, and it is confirmed that the point is spaced approximately 20 μm (that is, the depth of the inner oxide is approximately 16 μm) apart from a surface (the boundary between the environment and the outer oxide film after the outer oxide film is formed by pre-oxidation). Meanwhile, it was confirmed that the Al or Ti content is depleted to a depth of approximately 20 μm under the outer oxide film.

Example 2

Figure 2A:
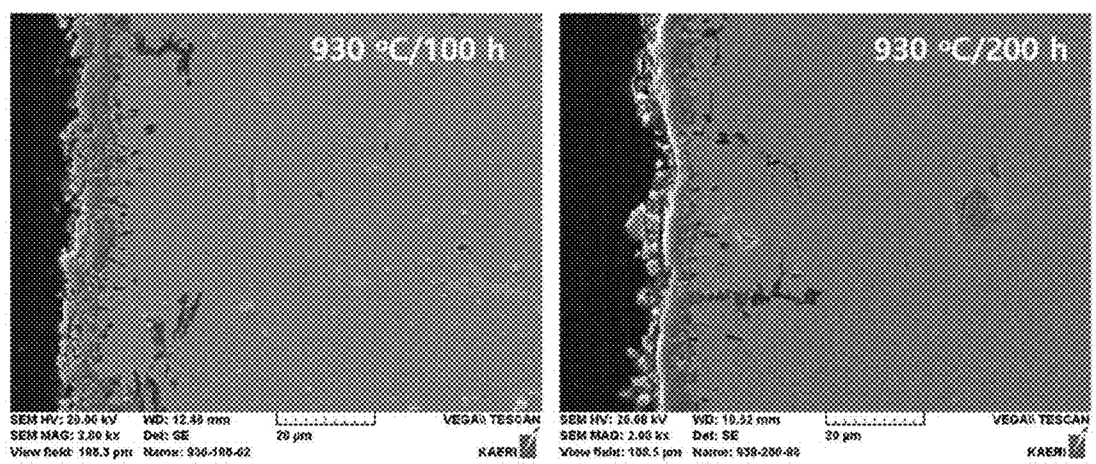
FIGS. 2A to 2C are scanning electron microscope (SEM) images of a nickel-based superalloy in which an outer oxide film, an inner oxide and a depletion layer are formed after pre-oxidation at 930° C. according to Example 2 and electronic probe microanalyzer (EPMA) graphs thereof.
Figure 2B:
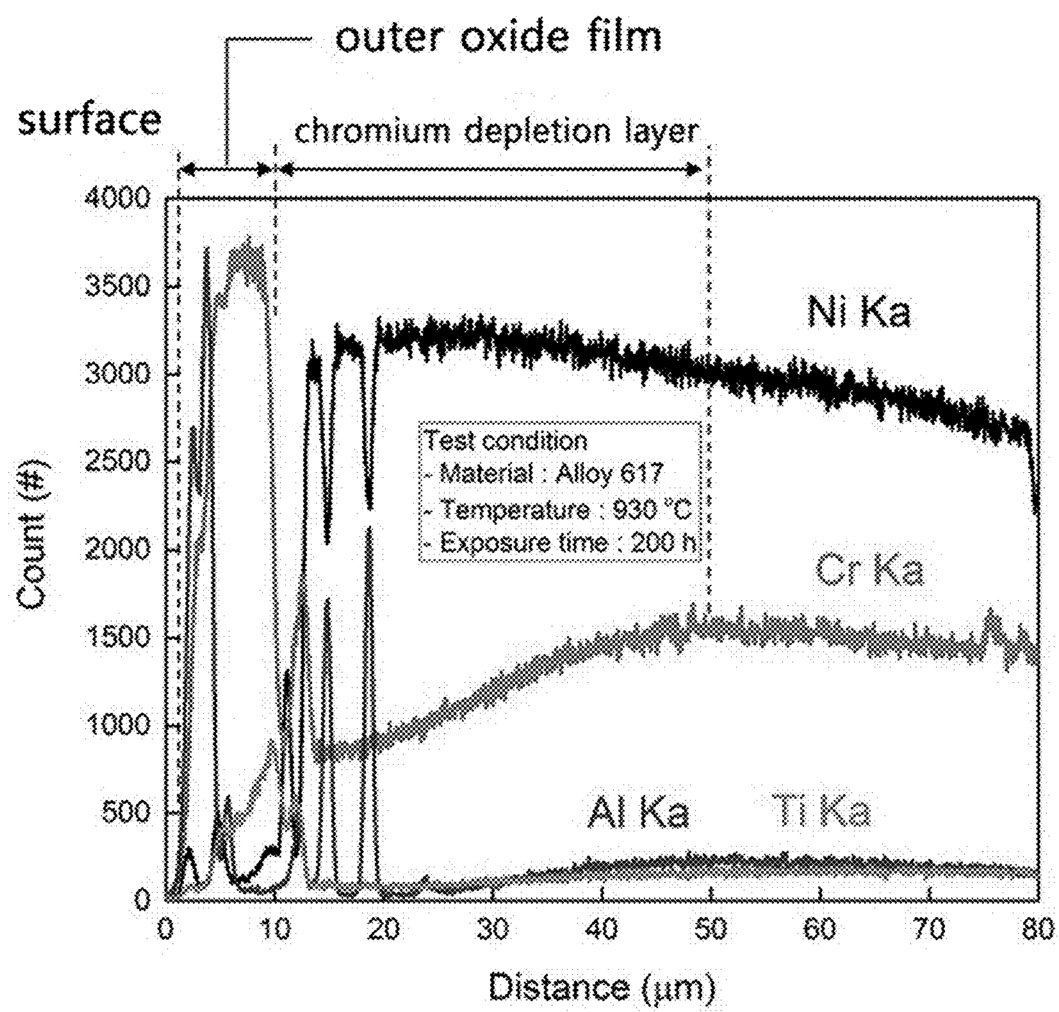
Figure 2C:
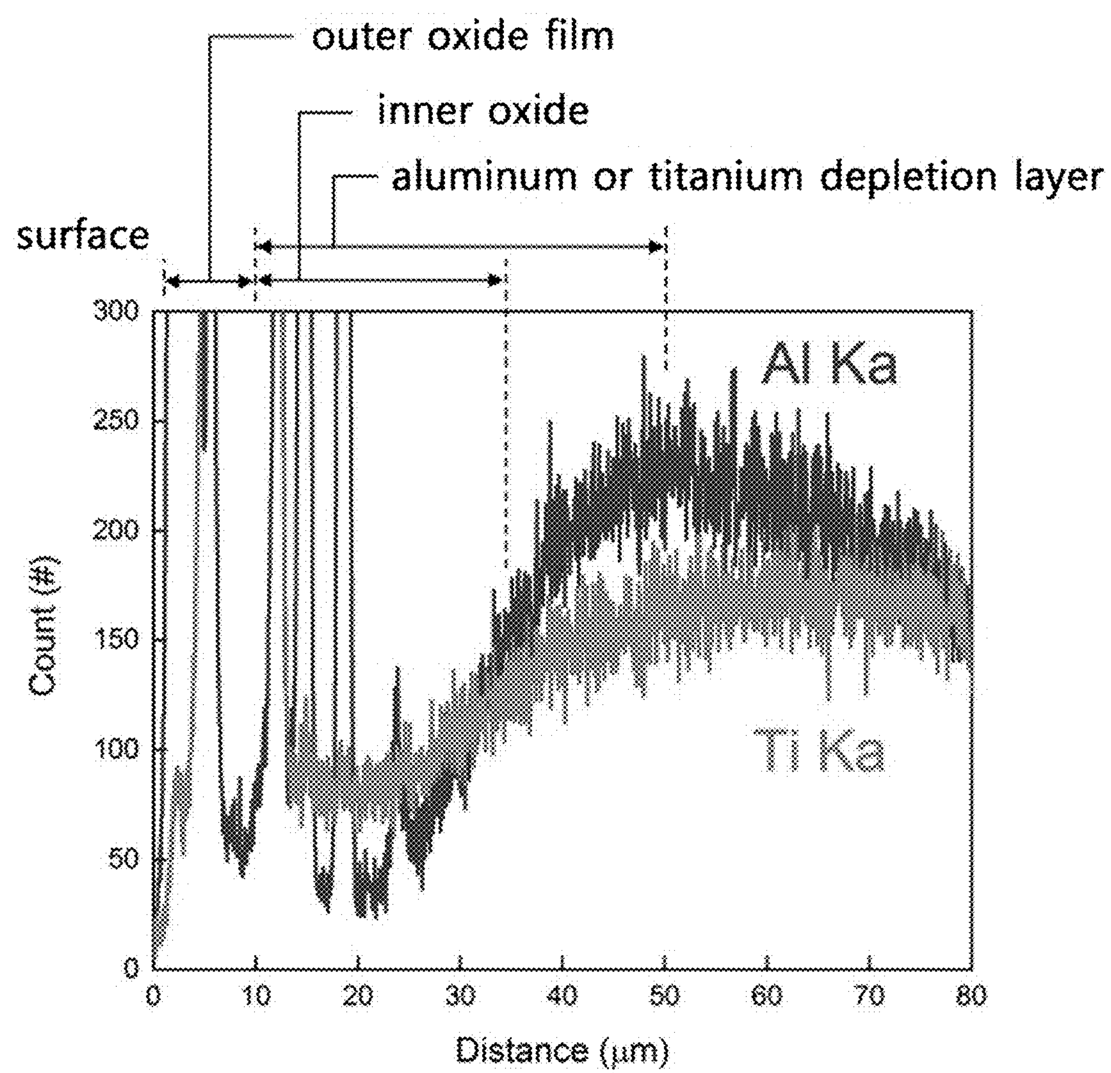
Figure 3A:
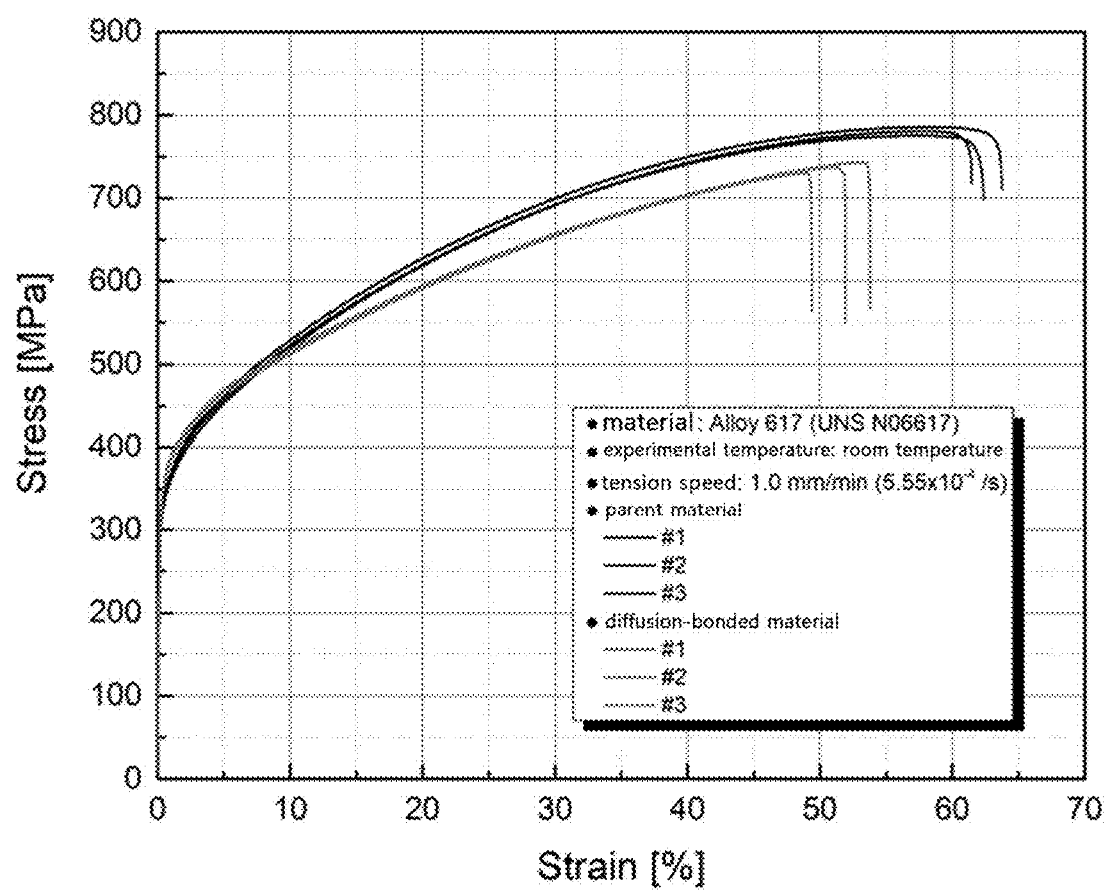
FIGS. 3A to 3E are stress-strain curves at various temperatures (room temperature, 500° C., 700° C., 800° C. and 900° C.) of a diffusion-bonded material according to Example 2.
Figure 3B:
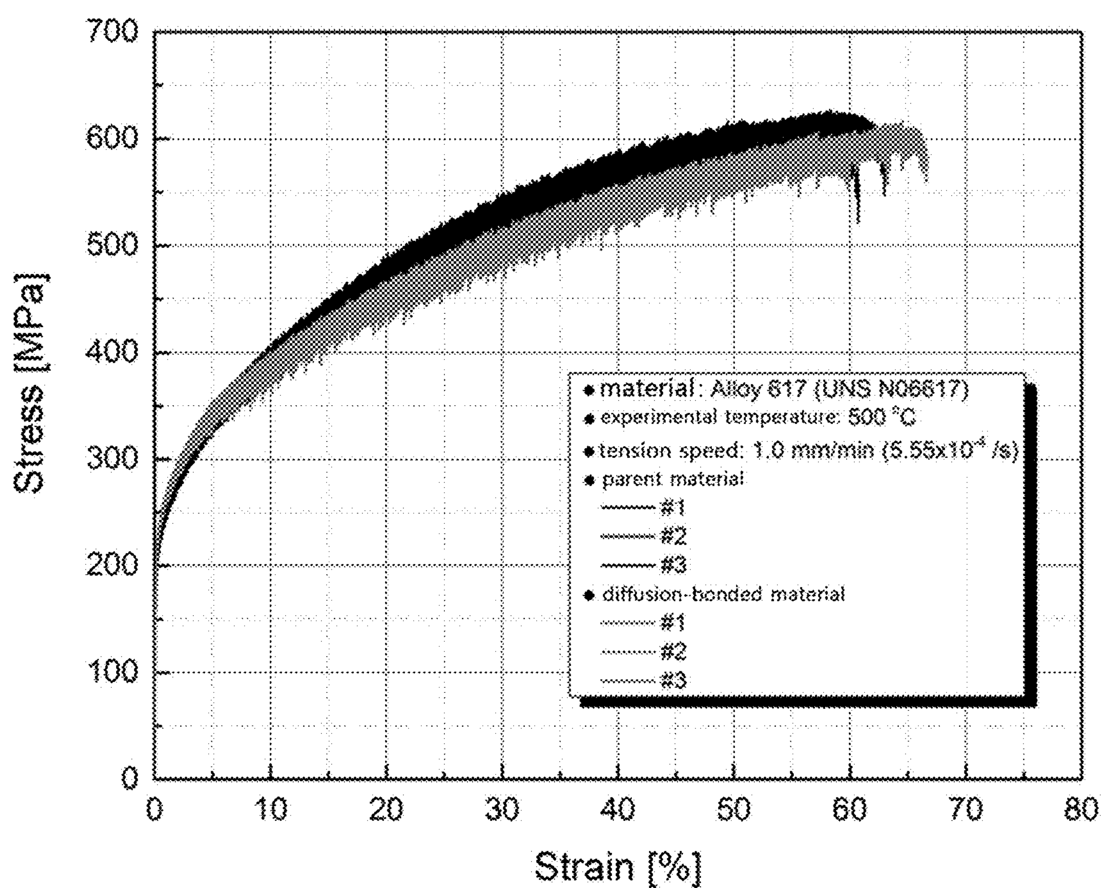
Figure 3C:
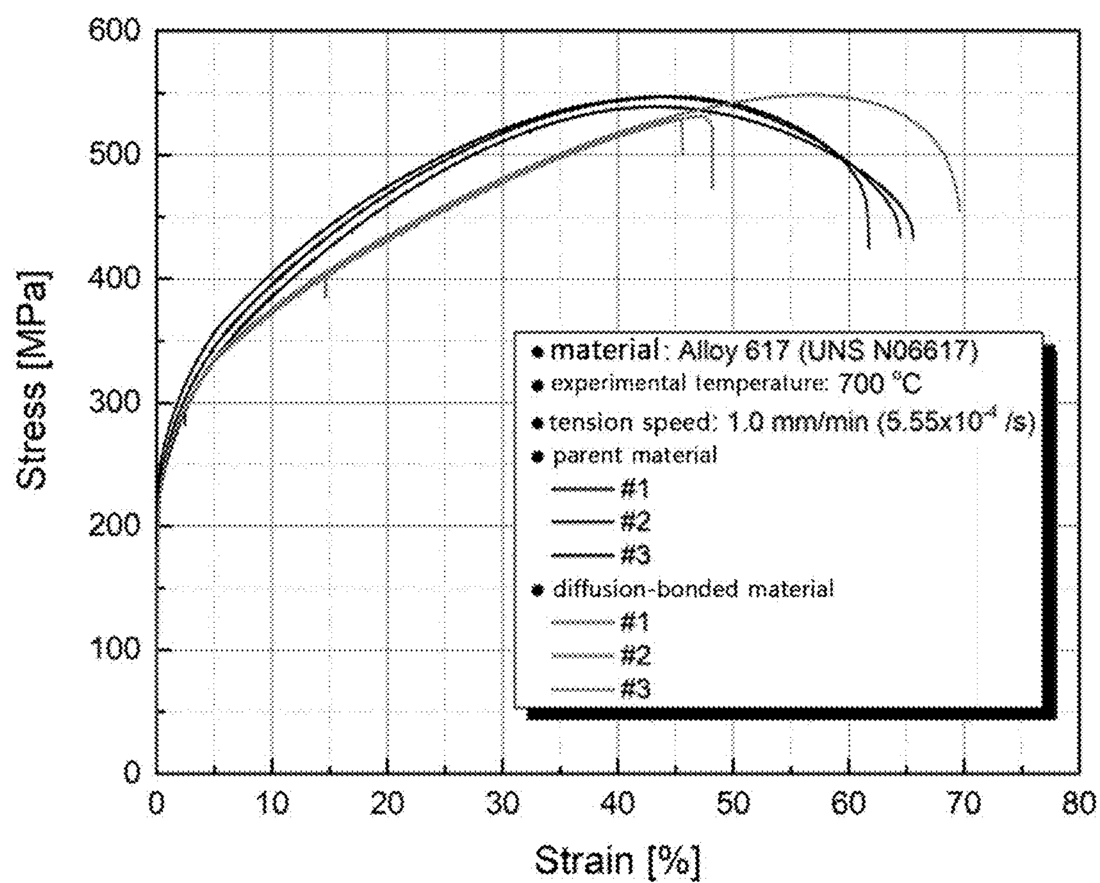
Figure 3D:
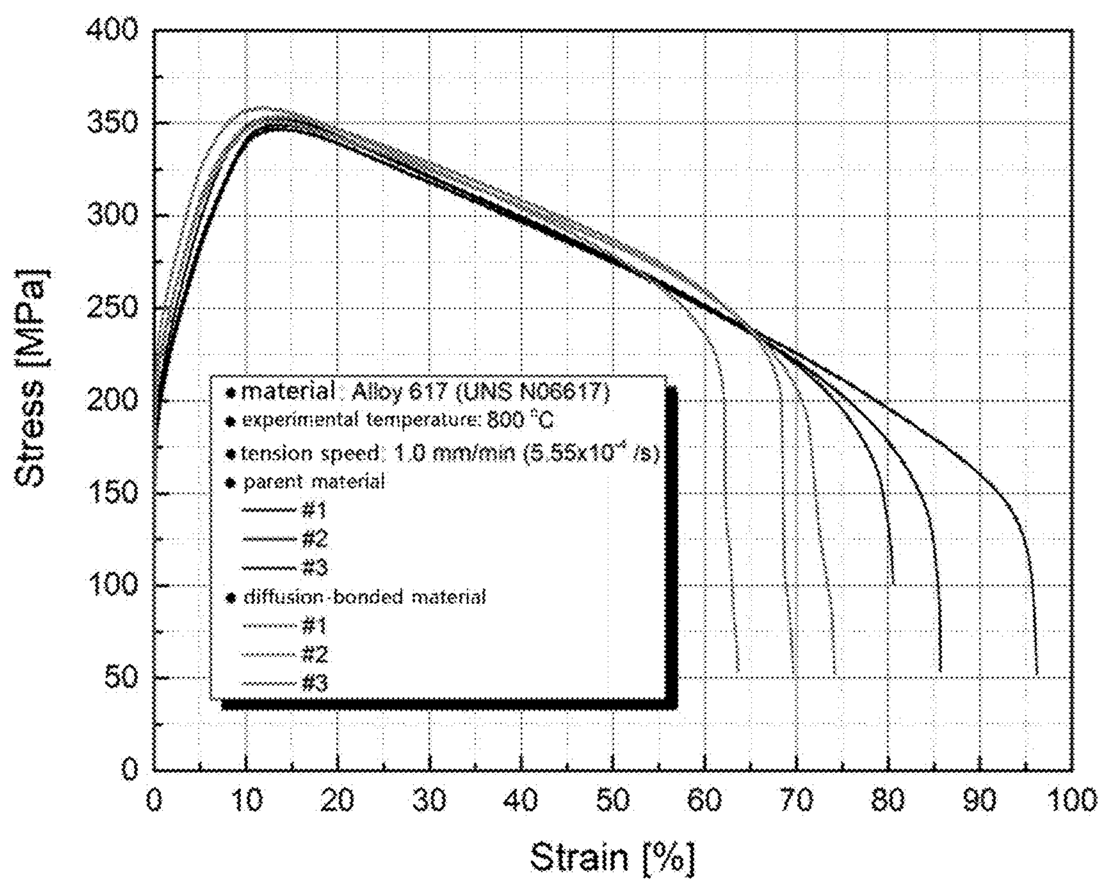
Figure 3E:
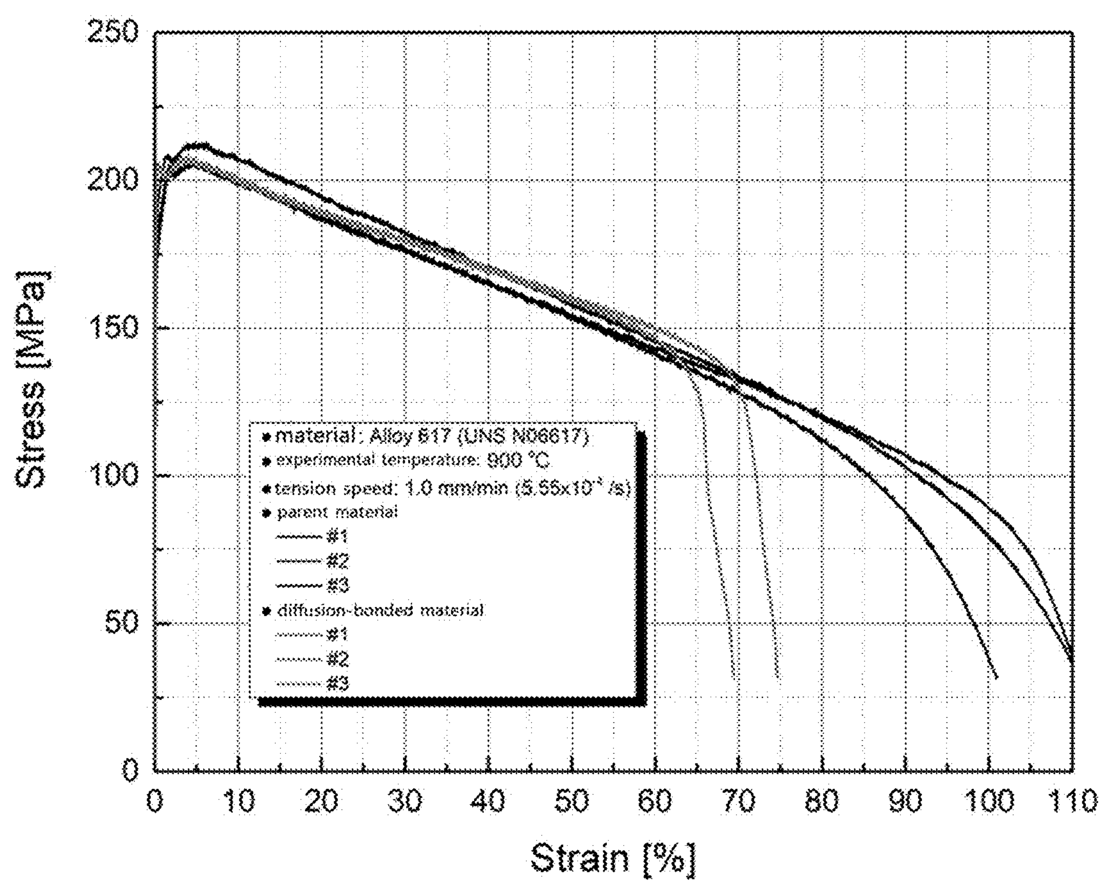

A process was performed by the same method as described in Example 1, except that plane-shaped Alloy 617 and UNS N06617 were pre-oxidized under atmospheric conditions at 930° C. for 100 to 200 hours to form an outer oxide film (containing chromium oxide) and an inner oxide (containing aluminum oxide and titanium oxide), respectively (see FIGS. 2A to 2C).

As confirmed from the SEM image of FIG. 2A, it is confirmed that as the pre-oxidation temperature increases and the pre-oxidation time elapses, both the thickness of the outer oxide film and the depth of the inner oxide increase.

In addition, as confirmed from the EPMA graph of FIG. 2B, the thickness of the outer oxide film is determined by a point where the final peak of the Cr composition is greatly reduced, and it is confirmed that the point is spaced approximately 8 μm apart from a surface (the boundary between the environment and the outer oxide film after the outer oxide film is formed by pre-oxidation).

In addition, as confirmed from the EPMA graph of FIG. 2C, the depth of the inner oxide is determined by the maximum point where the Al- or Ti-based inner oxide is formed in the matrix, and it is confirmed that the point is spaced approximately 32 μm (that is, the depth of the inner oxide is approximately 24 μm) apart from a surface (the boundary between the environment and the outer oxide film after the outer oxide film is formed by pre-oxidation). Meanwhile, it was confirmed that the Al or Ti content is depleted to a depth of approximately 40 μm under the outer oxide film.

Afterward, both the formed outer oxide film and inner oxide-containing layer were removed by mechanical polishing, followed by ethanol washing. Subsequently, it is confirmed that the depth of the surface depletion layer is spaced approximately 16 μm apart from the surface for diffusion bonding. Subsequently, a diffusion-bonded material was prepared by performing diffusion bonding on the surface for diffusion bonding at 1,150° C. under a compressive load of 14 MPa and a vacuum of $1\times10^{-5}$ Torr for 2 hours.

The prepared diffusion-bonded material was then subjected to final thermal treatment at 1,120° C. for 20 hours.

Experimental Example: Measurement of Stress-Strain Curve at Various Temperatures Stress-strain curves at various temperatures (room temperature, 500° C., 700° C., 800° C. and 900° C.) for the finally thermally-treated diffusion-bonded material according to Example 2 and plate-shaped Alloy 617 and UNS N06617 (parent materials) were plotted and compared according to ASTM E8/E8M and E21, and the results are shown in FIGS. 3A to 3E, respectively.

As confirmed from the stress-strain curves of FIGS. 3A to 3E, it is confirmed that the diffusion-bonded material according to Example 2 maintained the same levels of stress as those of the parent materials at both room temperature and high temperature. Particularly, it is confirmed that the diffusion-bonded material according to Example 2 has excellent strain at the parent material level at a high temperature of approximately 700° C. or more.

The present invention relates to a nickel-based superalloy (particularly, an alloy derived from a parent material of a solid solution strengthened nickel-based superalloy) including a surface depletion layer in a state in which an Al or Ti content is depleted and a method for diffusion bonding using the same. Due to the surface depletion layer, it is possible to move a planar grain boundary formed at an interface through diffusion according to composition differences of elements during diffusion bonding, and the secondary phase formation by Al or Ti at an interface may be effectively inhibited or reduced, thereby forming intermetallic bonds. Therefore, the diffusion-bonded nickel-based superalloy material according to the present invention maintains the same level of stress as that of a parent material at room temperature or high temperature, and has excellent strain at a parent material level, particularly, at a high temperature of approximately 700° C. or more so that it can be applied to the plate heat exchanger industry.

It should be understood by those of ordinary skill in the art that the above description of the present invention is exemplary, and the exemplary embodiments disclosed herein can be easily modified into other specific forms without departing from the technical spirit or essential features of the present invention. Therefore, the exemplary embodiments described above should be interpreted as illustrative and not limited in any aspect.

What is claimed is:

1. A method for diffusion bonding of a nickel-based superalloy, comprising:

(a) sequentially forming a nickel oxide (NiO) layer, a nickel-chromium composite oxide ($NiO—Cr_2O_3$) layer and a chromium oxide ($Cr_2O_3$) layer that are included in an outer oxide film, and forming an inner oxide, by pre-oxidizing a nickel-based superalloy parent material;

(b) removing the formed outer oxide film and an inner oxide-containing layer; and (c) preparing a diffusion-bonded nickel-based superalloy material by performing diffusion bonding on the nickel-based superalloy from which the outer oxide film and inner oxide-containing layer are removed under a vacuum condition at 1,000 to 1,200° C. and under a compressive load of 10 to 20 MPa for 1 to 5 hours, wherein, in Step (c), the nickel-based superalloy comprises a surface depletion layer in a state in which an Al or Ti content is depleted, and the surface depletion layer is formed to a depth of 50 μm or less from a surface for diffusion bonding, wherein the pre-oxidation in Step (a) is performed under atmospheric conditions at 600 to 1,200° C. for 200 to 500 hours, and wherein the nickel-based superalloy comprises 20.0 to 24.0 wt % of chromium (Cr); 10.0 to 15.0 wt % of cobalt (Co); 8.0 to 10.0 wt % of molybdenum (Mo); 0.8 to 1.5 wt % of aluminum (Al); 0.6 wt % or less of titanium (Ti); and the remainder of nickel (Ni).

2. The method of claim 1, wherein the pre-oxidation in Step (a) is performed under atmospheric conditions at 700 to 1,050° C. for 200 to 500 hours.

3. The method of claim 1, wherein, in Step (a), the outer oxide film comprises chromium oxide and has a thickness of 0.1 to 50 μm.

4. The method of claim 1, wherein, in Step (a), the inner oxide comprises aluminum oxide, titanium oxide or a combination thereof, and has a depth of 1 to 100 μm.

5. The method of claim 1, wherein, in Step (c), during the diffusion bonding, the secondary phase formation by Al or Ti at the interface between the nickel-based superalloys is inhibited or reduced.

6. The method of claim 1, further comprising:

(d) thermally treating the formed diffusion-bonded nickel-based superalloy material at 1,000 to 1,200° C. for 1 to 100 hours.

7. The method of claim 1, wherein when the surface depletion layer is divided into an upper surface depletion layer and a lower surface depletion layer based on the halfway point of the depth of the surface depletion layer, the upper surface depletion layer has a higher degree of depletion of Al or Ti content compared to the lower surface depletion layer.

* * * * *